UNITED STATES PATENT OFFICE.

HERMAN HEUSER, OF CHICAGO, ILLINOIS.

MANUFACTURE OF ALCOHOL-REDUCED BEER.

1,302,551.

Specification of Letters Patent.

Patented May 6, 1919.

No Drawing.

Application filed November 4, 1918. Serial No. 260,952.

*To all whom it may concern:*

Be it known that I, HERMAN HEUSER, a citizen of the United States, residing at Chicago, in the county of Cook and State of Illinois, have invented certain new and useful Improvements in the Manufacture of Alcohol-Reduced Beer, of which the following is a specification.

My invention refers to the manufacture of alcohol-reduced beverages made from fermented beverages such as beer beverages, and in particular it refers to the manufacture of non-intoxicating beer containing a small amount of alcohol, as for instance less than ½ of 1% by volume, which is the internal revenue taxable limit. More particularly my present invention consists in subjecting alcohol-reduced beer to the action of fermenting wort or kraeusen containing the elements of yeast fermentation under such conditions that while the fermentation of the wort will restore the characteristic taste and flavor of the original beer to the alcohol-reduced beer it will not carbonate the latter, and then carbonating the uncarbonated mixture by any artificial means.

In carrying out my invention, any kind of beer may serve as a base for the operations to be described, and any suitable apparatus may be employed. I prefer however, to use beer of normal gravity, thoroughly fermented, well clarified, and light in color, and the following exemplification of my invention is based on its application to beer of customary composition and usual alcoholic character. Assuming that the quantity to be processed is 100 barrels of such beer, this quantity is subjected to boiling for the reduction of its alcohol to the desired extent. When the alcohol-content of the beer has been reduced to say 0.07% by volume determined after the volume rectification to the original 100 barrels has taken place, the beer is cooled to a suitable temperature, say 48° F., and at this temperature it is mixed with fermenting wort, which has an alcohol-producing capacity of 3.50% by volume and is pitched to the barrel with 2 pounds of thick-fluid vigorous yeast containing lactic acid bacteria. While fermenting wort even at the first kraeusen stage contains a considerable percentage of alcohol and its $CO_2$ content is proportionately small when compared with the amount of alcohol, as most of the $CO_2$ escapes into the atmosphere, and so its addition to the alcohol-reduced beer increases the alcohol-content of the beer considerably without proportionally increasing its $CO_2$ content or effervescence, I preferably use wort in an advanced state of fermentation, provided it is not entirely fermented, as it increases the alcohol-content of the beer and produces in it a smaller amount of $CO_2$ on account of its being fermented to a larger degree when it is added, and as my invention avoids carbonating the beer by kraeusen fermentation and contemplates the subsequent carbonation of the kraeusen fermented beer by artificial means it utilizes wort in advanced fermentation to take advantage of the more vigorous condition of the yeast in such wort, as well as the improved taste and flavor of such wort due to the fact that by its advanced fermentation it has lost its raw wort flavor and wort taste and has acquired a beery taste and flavor.

The alcohol-reduced beer is subjected to the action of the fermenting wort or kraeusen under such conditions that while the kraeusen-fermentation restores the taste and flavor of the original beer to the alcohol-reduced beer it will not carbonate the latter, as for example by using a smaller amount of wort than is necessary to develop a sufficient amount of carbonic acid gas to effervesce or carbonate the beer, say 5 barrels of such wort to 100 barrels of the alcohol-reduced beer, or by treating the alcohol-reduced beer with the wort in a vessel communicating with the air; in the latter case the amount of wort added to the beer can be varied to produce an alcohol-content of any desired extent without carbonating the beer as the $CO_2$ escapes to the atmosphere. The fermentation of the wort at once improves the taste and flavor of the beer, and when the beer and wort have been thoroughly mixed the mixture is stored at a temperature of about 48° F. for about a week to stimulate yeast fermentation, as well as the activity of the lactic acid bacteria, and then it is cooled to the storage temperatures of beer, say 37° or 38° F., to avoid infection liable to occur at higher temperatures, and is stored at such temperature for sufficient time to enable the fermentative and propagative functions or activities of the yeast to take place to complete the restoration of the characteristic beer taste and flavor. The activity of the yeast thus is unimpeded and unimpaired as the amount of $CO_2$ that may be in the beer is too small to exercise any retarding effect thereon, and as the restoration of the taste and flavor imparted by the yeast and lactic acid bacteria is not affected by the very small amount of carbonic acid gas that may be present in the mixture, it is carried to its maximum degree. The taste and flavor improvement in the beer is watched by periodical sampling, and when it has advanced to the desired degree, which may take a week or two, the beer containing by this time an alcohol-content of 0.24% by volume is subjected to artificial carbonation by any well known means. Such carbonation may be preferably carried out to the best advantage by carbonating the beer in bulk while it is being mechanically stirred. Finally, after having been clarified by filtration, the beer is ready for the market.

I am aware that it has been proposed to introduce into cooled alcohol-reduced beer about fifteen per cent. of kraeusen to produce a secondary fermentation to restore the taste, flavor and effervescence of the original beer, and that in such process the effervescence is produced by the carbonation of the beer by the carbonic acid gas developed by this kraeusen fermentation, as in the patents to Uhlmann, No. 613,915, dated Nov. 8, 1898, and Nilson, No. 721,383, dated Feb. 2, 1903. In such a process the kraeusen carbonation of the beer is necessarily done in a closed or bunged vessel, in the same way that it is done in the customary chipcask fermentation of regular beer, because otherwise the carbonic acid gas would escape without performing its carbonating function; and such kraeusen carbonation proceeds under a bunging pressure of 5 or 6 pounds, while simultaneously large quantities of $CO_2$ are blown off through the bunging apparatus. This necessitates the addition of a large amount of fermentable carbohydrates to produce the necessary volume of $CO_2$, because unlike regular beer which contains 0.30% of $CO_2$ alcohol-reduced beer contains no $CO_2$ and as beer must contain 0.41% of $CO_2$ before it attains the average degree of chipcask effervescence alcohol-reduced beer requires about four times as much $CO_2$ as regular beer to make it properly effervescent. The result is that such kraeusen carbonation permits only the fermentative or alcohol-and $CO_2$-producing action of the yeast and the large amount of $CO_2$ arrests the propagative action of the yeast, as well as the action of the lactic acid bacteria, and so the taste and flavor restoring activities of these elements are retarded, it being well-known that where the working of yeast is limited to its fermentative action alcohol and $CO_2$ are abundantly produced but the characteristic taste and flavor of the yeast are not reproduced or restored, and that in treating beer $CO_2$ exercises a pronounced retarding effect upon both the propagative and fermentative actions of the yeast (see page 170 of "*Die Gaerunge-fuehrung*" by Delbrueck and Hayduck) and that 0.40% of $CO_2$ stops the yeast propagation (see "*Illustriertes Brauerei Lexicon*" 1910, Vol. 2 p. 369, by Delbrueck). In the kraeusen carbonation of alcohol-reduced beer a minimum amount of kraeusen having a certain alcohol or carbonic acid gas producing capacity is necessary to carbonate the beer, for example with kraeusen having an alcohol-producing capacity of 3.50% by volume corresponding to a $CO_2$-producing capacity of 2.63%, 23 barrels of such kraeusen are necessary to carbonate 77 barrels of alcohol-reduced beer to produce 100 barrels of carbonated beer, it being understood that normally 0.41% of $CO_2$ is retained in the beer and at least 0.20% is blown off. Also, the kraeusen carbonation precludes stabilizing the alcohol contents of the beer as of the $CO_2$ developed the amount retained averages at the usual bunging pressure not less than 0.41% and the amount blown off during the long time required for this treatment is between 0.20% and 0.40%, so that taking the development of alcohol and $CO_2$ by yeast fermentation at the correct ratio of 51.11 to 48.89 and the specific gravity of alcohol at 0.7935, it is obvious that the amount of $CO_2$ retained in the beer corresponds to 0.54% of alcohol by volume and the amount of $CO_2$ blown off through the bunging apparatus may correspond to the same figure, whereby the total amount of alcohol produced by kraeusen carbonation is about 1% by volume. So it is not practical to stabilize the alcohol-content of those beverages made by kraeusen carbonation within the internal revenue limit of less than ½ of 1% by volume, and as the commercial alcohol-reduced beers contain an alcohol-rest of from 0.05 to 0.15% of alcohol by volume after the volume rectification to the original amount has taken place, this alcohol-rest added to the alcohol produced by kraeusen carbonation increases the uncertainty of stabilizing by kraeusen carbonation the alcohol to this small amount permitted by the internal revenue regulation.

On the other hand, my invention obviates these disadvantages. By adding the kraeusen to the alcohol-reduced beverage under such conditions that kraeusen carbonation does not occur I can use the small amount of kraeusen that is sufficient to produce the fermentation for restoring the taste and flavor of the original beverage but is below the minimum amount necessary for carbonation, and so I am able to stabilize the alcohol-content at any predetermined amount. I also am able to utilize both the fermentative and propagative actions of the yeast, as the small amount of $CO_2$ that may be present in the beverage is insufficient to arrest this propagative action, which therefore acts to its full extent and without retardation to reproduce in full degree the characteristic taste and flavor of the original beverage. My invention permits the utilization of the propagative action of the yeast in analogy with its action in the main fermentation of wort or beer where the characteristic taste and flavor of the original beverage are produced. By dispensing with kraeusen carbonation I am also able to artificially carbonate the beverage to restore its effervescence after the taste and flavor restoration by the propagative action of the yeast contained in the added kraeusen has taken place in the alcohol-reduced beer and so without impairing the restored taste or flavor. Also, the action of the lactic acid bacteria contained in the pitching yeast imparts to the beverage the pungent taste of the original beer and helps to remove the burnt taste or flavor imparted by boiling to the alcohol-reduced beverage, and as $CO_2$ is inimical to the growth and development of such bacteria they are given full freedom of action by my invention as the $CO_2$ in the beer is negligible, while there is no danger of too much lactic acid being formed as the low temperature at which the bacteria are present in the beverage keeps their action within beneficial limits, it being understood that the bacteria are readily acclimated to the temperatures employed as their activity can be preserved at even the lower temperatures at which ordinary chipcask fermentation of regular beer proceeds as is apparent from the fact that many regular beers contain large quantities of lactic acid.

I mean by beer beverages all beverages made by yeast fermentation of liquids possessing in solution the essential constituents of beer wort in about the same ratio as beer wort, it being immaterial from what materials or by what process such liquids are made.

I mean by "wort" as used in the claims hereof wort or kraeusen containing the required elements of fermentation. This application is a continuation of parts of my co-pending application filed July 25th, 1914, bearing Serial Number 853,059.

I claim:—

1. In the manufacture of alcohol-reduced beer, the process which consists in subjecting alcohol-reduced beer to the action of fermenting wort without carbonating it, and then artificially carbonating the beer.

2. In the manufacture of alcohol-reduced beer, the process which consists in reducing the alcohol content of beer, subjecting the alcohol-reduced beer to the fermenting action of wort in an advanced state of fermentation without carbonating the beer, and then artificially carbonating the beer.

3. In the manufacture of alcohol-reduced beer, the process which consists in reducing the alcohol content of beer below one-half of one per cent. by volume, subjecting the alcohol-reduced beer to the action of fermenting wort in such manner that the alcohol content of the fermented beer is below one-half of one per cent. by volume and without carbonating the beer, and then artificially carbonating the beer.

In testimony whereof I affix my signature in presence of two witnesses.

HERMAN HEUSER.

Witnesses:
J. McRoberts,
Bernice Gormley.